3,403,172
HARD, HIGH-MELTING WAXES FROM LONG-CHAIN N-ALLYLAMIDES
Edmund F. Jordan, Jr., and Bohdan Artymyshyn, Philadelphia, and Arthur N. Wrigley, Oreland, Pa., assignors to the United States of America as represented by the Secretary of Agriculture
No Drawing. Filed Jan. 3, 1964, Ser. No. 335,701
5 Claims. (Cl. 260—404.5)

ABSTRACT OF THE DISCLOSURE

The polymerization behavior of N-allylamides is shown to be markedly different from that of most allyl compounds, in that relatively little polymer is formed when they are treated with a catalytic amount of peroxide or other source of free radicals. When long carbon chain N-allylamides are partially polymerized by reaction with a peroxide or other source of free radicals the product is a mixture of polymeric and nonpolymeric components and has physical and mechanical properties resembling those of carnauba and other hard waxes.

A non-exclusive, irrevocable, royalty-free license in the invention herein described, throughout the world for all purposes of the United States Government, with the power to grant sublicenses for such purposes, is hereby granted to the Government of the United States of America.

This invention relates to polymerization of long-chain N-allylamides. More particularly this invention relates to incomplete polymerization of an N-allylamide such as N-allylstearamide using a free radical initiator to produce wax compositions, especially a wax whose physical and mechanical properties resemble carnauba wax.

The polymerization behavior of N-allylamides is quite different from that of most allyl compounds. Heretofore, it was generally considered that N-allylamides could not be polymerized. The present inventors have observed in using benzoyl peroxide as the polymerization initiator, and in amounts sufficient to polymerize most allyl compounds to high conversion, that with N-allylamides the peroxide decomposes rapidly while effecting very little polymerization.

We have discovered that the crude reaction product mixtures formed when small amounts of a free radical initiator are heated with an N-allylamide such as N-allylstearamide are valuable waxes of exceptionally light color. It is most unexpected that N-allylstearamide monomer, a crystalline, non-waxy material, provides a very hard wax resembling carnauba wax, upon reaction with as little as 0.25 mole percent benzoyl peroxide.

An object of the present invention is to prepare useful waxes ranging in physical property from fairly soft to very hard. Another object is to prepare waxes which are suitable substitutes for carnauba, candelilla, and other natural ester waxes. A further object is to prepare useful waxes from N-allylstearamide and related N-allylamides. Other objects and a fuller understanding of the invention may be had by referring to the following description and claims.

According to the present invention a long carbon chain N-allylamide and a free radical initiator are combined and heated until the reaction is substantially complete to produce a waxy compositioin.

Compositions obtained were characterized and evaluated by floor wear tests and were found to compare favorably with hard waxes of commerce.

Investigation of the constituents of the compositions resulting from the reaction of benzoyl peroxide with N-allylstearamide has revealed that, in addition to polyallylstearamide of low molecular weight, the other products of the reaction are benzoic acid, benzene, benzoate ester of the amide substituted on the allylic carbon, and a phenyl substitution product of the amide substituted on the allylic carbon. The inventors have characterized this system quantitatively by observing that the amounts of non-polymeric product formed in moles/kg. are a linear function of the initiator concentration, in equivalents per kg. up to at least 40 mole percent of benzoyl peroxide based on amide. In addition, the amount of amide entering polymer (as indicated by measurements of decrease in unsaturation) relates to the initial peroxide concentration linearly when the log of amide remaining is plotted as function of initiator concentration in equivalents per kilogram. There are two equivalents of benzoyl peroxide per mole of benzoyl peroxide. Thus, this system has been characterized by a series of slope constants, which accurately predict product concentration for any given amount of added peroxide. The slope constants for the benzoyl peroxide initiation of N-allylstearamide are given in the table below.

TABLE I.—SLOPE CONSTANTS FOR THE POLYMERIZATION OF N-ALLYLSTEARAMIDE [1]

| Product concentration—mole/kg. amide: | Slope |
|---|---|
| Benzoic acid | 0.570 |
| Benzene | 0.086 |
| Amide, substituted by benzoate | 0.320 |
| Amide, substituted by phenyl | 0.087 |
| Amide, entering polymer | [2]—0.1771 |

[1] When (I)=eq./kg.
[2] Log mole fraction amide remaining vs. (I), eq./kg.

The amount of any given non-polymeric product formed, in mole/kg. amide, can be readily computed by merely multiplying the proper slope constants by the initiator equivalents. Similarly, the mole fraction of amide entering polymer may be computed by multiplying the negative slope by the initiator equivalents in moles per kilogram of amide and then subtracting the anti log from 1. These data illustrate (1) that simple polymeric species are not the sole product of peroxide decomposition in amides as they are in most allyl compounds, and (2) that for a given increment of added benzoyl peroxide, considerable unpolymerized and unreacted amide monomer remains in the system, the amount increasing with decrease in initiator concentration.

Pure polymer isolated from the reaction mixture is a soft crumbly waxy material, M.P. ca. 75° C., and, as such, is of no special technological value. In addition, pure monomeric N-allylstearamide is a white, highly crystalline, non-waxlike compound and as such is of no commercial value. If pure polymer is isolated from a highly polymerized sample of N-allylstearamide and then fused with pure monomer in the proportions corresponding to a reaction when, for example, 4 mole percent of benzoyl peroxide is the initiator, the product is a wax whose physical properties resemble, but do not duplicate, those of the wax from the initiated reaction. Thus, it is the poly-N-allylstearamide, together with the other products resulting from the partial polymerization that are fully responsible for the desirable wax properties obtained.

N-allylstearamide cannot be converted into useful wax compositions by blending with a material structurally resembling the pure monomer, as in the mixtures with N-butylstearamide, methylstearate and carnauba wax of Example 11–13, respectively. The amounts of the latter components added correspond to the polymer content in weight percent when 4 mole percent of benzoyl peroxide is used as the polymer initiator.

Although the process listed in the examples is a bulk process, selected for its simplicity, this in no way limits the method of polymerization. Polymerization by conventional aqueous emulsion, dispersion or solution polymerization can also be used to make the waxes of this invention. However, in solution polymerization care must be taken to select solvents of low transfer efficiency so as not to seriously affect the reaction mechanism of this invention.

The initiator most extensively studied by the inventors has been benzoyl peroxide, but there is no intention to imply that this is the only initiator or mode of initiation that will convert N-allylamides by partial polymerization to useful waxes. The inventors have found that any peroxide or azo-type initiation such as by azobisisobutyronitrile, dichlorobenzoyl peroxide, t-butyl peroxide, lauroyl peroxide, hydroxy heptyl peroxide, succinic acid peroxide, methyl ethyl ketone peroxide or hydroperoxides such as cumene hydroperoxide, p-methane hydroperoxide, pinane hydroperoxide, etc., or more generally any free radical source, such as by photosensitized initiation or redox initiation or by high-speed irradiation of any type which can generate free radicals in the amide, will convert N-allyl-stearamide and similar N-allylamides to useful waxes by partial homopolymerization.

The optimum temperature for conducting the reaction will vary slightly with the particular combination of N-allyl amide and means of generating free radicals, but is preferably above about 90° C. At this temperature the N-allyl alkylamide is a liquid and there is sufficient energy to promote the formation of free radicals. When the initiator is a peroxide the course of the reaction is readily followed by periodically removing an aliquot and testing for presence of peroxide.

The N-allylamides used in the process may be prepared from purified long carbon chain fatty acid esters or from low-cost hydrogenated tallow and seed oils by the process of Meade, U.S. Patent No. 2,464,094 as further exemplified by Jordan et al., J. Am. Oil Chem. Soc. 38, pp. 600–605 (1961). Melting point of the resulting wax will, of course, be a function of amide chain length and amide purity.

Example 5 illustrates the general procedure used in Examples 1 through 10.

EXAMPLE 5

Fifty g. pure N-allylstearamide, M.P. 83.8–84.3° C. was heated to 90° C. in a flask sparged with a gentle stream of nitrogen and fitted with a short column open to the atmosphere. A total of 1.1228 g. benzoyl peroxide (3 mole percent based on monomer) in small 0.1 to 0.2 g. increments was added over a period of 1 to 1.5 hours. Each increment was added when the previous one had nearly disappeared. This procedure was followed for safety conditions. When all peroxide had been added heating was continued for 3 hours, or for about two times the life of the peroxide and the resulting wax was poured into a dish to cool.

The composition of the products of Examples 1 to 10, computed from the data of Table I, are listed in Table II.

TABLE II.—EXAMPLES PREPARED BY GENERAL PROCEDURE AND THEIR COMPOSITION

| Example | Benzoyl Peroxide Mole, Percent | Estimated Wax Composition, weight percent [1] | | | | | | |
|---|---|---|---|---|---|---|---|---|
| | | Benzoic Acid | Benzene | Amide, substituted by Benzoate | Amide, substituted by Phenyl | Amide in Polymer | Total Reacted Amide | Unreacted Amide |
| 1 | .25 | .108 | .010 | .220 | .054 | .630 | .904 | 99.10 |
| 2 | .50 | .215 | .021 | .440 | .108 | 1.250 | 1.798 | 98.20 |
| 3 | 1.0 | .430 | .042 | .880 | .216 | 2.490 | 3.586 | 96.41 |
| 4 | 2.0 | .861 | .083 | 1.759 | .431 | 4.920 | 7.110 | 92.89 |
| 5 | 3.0 | 1.291 | .125 | 2.639 | .646 | 7.290 | 10.575 | 89.43 |
| 6 | 4.0 | 1.721 | .166 | 3.519 | .862 | 9.610 | 13.991 | 86.00 |
| 7 | 6.0 | 2.582 | .249 | 5.278 | 1.293 | 14.05 | 20.621 | 79.38 |
| 8 | 8.0 | 3.442 | .332 | 7.038 | 1.724 | 18.26 | 27.022 | 72.98 |
| 9 | 10.0 | 4.268 | .415 | 8.797 | 2.155 | 22.30 | 33.252 | 66.75 |
| 10 | 12.0 | 5.163 | .498 | 10.557 | 2.586 | 26.10 | 39.243 | 60.76 |

[1] These calculations assume that the substituted amide monomers do not enter the polymer.

Synthetic mixtures were prepared to demonstrate that the wax product could not be obtained by simple formulations.

EXAMPLE 11

Materials combined and weight percent of each are as follows: pure N-allylstearamide, 88.90; benzoic acid, 1.65; and N-butylstearamide, 9.45. This mixture corresponds, roughly, to the composition which results when 4 mole percent of benzoyl peroxide is decomposed in N-allylstearamide (see Table II). The product did not have the wax properties of the compositions of the present invention (see Table III).

EXAMPLES 12 AND 13

These examples were identical with Example 11 except that the N-butylstearamide was replaced by methylstearate and carnauba wax, respectively.

As an example of a wax prepared from N-allylstearamide using an initiator other than benzoyl peroxide, the example below is presented.

EXAMPLE 14

The procedure of Example 5 was followed except that the temperature was 95° C. and 9.72 g. of N-allylstearamide was reacted with 0.1781 (3.96 mole percent) of azobisisobutyronitrile. The reaction product was a wax of high gloss, Shore hardness 99.3, and contained 3.86 weight percent polymer.

Some physical properties of the products of Examples 1–13 were determined and were compared in Table III with data obtained on selected hard waxes of commerce.

TABLE III.—PHYSICAL PROPERTIES OF WAXES COMPARED WITH THOSE OF COMMERCIAL WAXES

| Wax | Initial Benzoyl peroxide, mole percent | M.P., °C. | Hardness, 25° C. | | Tensile Strength,[3] lb./sq. in., percent |
|---|---|---|---|---|---|
| | | | Needle penetration[1] | Shore[2] | |
| Carnauba, brown | | 82–83.5 | 1.1 | 100 | 249.4±9.2 |
| Carnauba, yellow | | 83–86 | .7 | 99.9 | 517.9±11.3 |
| Candelilla | | 76–77 | 2.2 | 98.1 | 269.7±23.9 |
| Microcrystalline | | 88–93 | 4.8 | 93.2 | 243.8±7.5 |
| Paraffin | | 57.2–58.3 | 12.3 | 75.4 | 137.2±10.6 |
| AC Polyethylene | | 97–106 | | 96.3 | |
| N-allylstearamide, pure | 0 | 83.8–84.3 | 14.7 | 76.4 | 14.2 |
| Example: | | | | | |
| 1 | .25 | 83.5–84.5 | 1.5 | 99.8 | 220.7±25 |
| 2 | .50 | 83.5–84.5 | 1.1 | 99.7 | 376.5±23.5 |
| 3 | 1.00 | 83.0–84.0 | 1.5 | 99.3 | 364.5±8.9 |
| 4 | 2.00 | 82.0–83.5 | 1.5 | 99.1 | 246.4±15.6 |
| 5 | 3.00 | 81.0–82.0 | 1.6 | 98.5 | 267.4±16.2 |
| 6 | 4.00 | 81.0–81.5 | 1.4 | 99.7 | 262.8±12.5 |
| 7 | 6.00 | 79.5–80.5 | 2.2 | 98.6 | 168.5±10.0 |
| 8 | 8.00 | 78.5–79.5 | 3.0 | 98.5 | 195.3±17.5 |
| 9 | 10.00 | 77.5–78.5 | 3.0 | 98.5 | |
| 10 | 12.00 | 75.5–77.5 | 3.6 | 98.5 | 196.5±18.1 |
| 11 | ([4]) | | 6.3 | 73.0 | |
| 12 | ([4]) | | 8.5 | 81.5 | |
| 13 | ([4]) | | | 87.5 | |

[1] ASTM D1321–57T.
[2] ASTM D676–58T, 15 seconds.
[3] ASTM D1320–60T; method slightly modified.
[4] Synthetic mixture.

The waxes in the above examples were characterized by high gloss and easy buffability. A slight haziness, noticeable on storage and caused by exudation of benzoic acid can be prevented by heating the wax at 150° C. for 4 hours under vacuum. They can be formulated into pastes and deposited on the floor to give tough durable films of exceptionally high gloss. The results of floor wear tests on the wax of Example 6 are compared with carnauba in Table IV, using the simplified paste formulations listed below:

| | Parts by Weight | |
|---|---|---|
| | Example 6 | Carnauba |
| Wax | 5.00 | 5.00 |
| Mineral Spirits | 7.21 | 9.61 |
| Turpentine | 1.08 | 1.44 |
| | 13.29 | 16.05 |

TABLE IV.—FLOOR-WEAR TEST RESULTS

| Time, Wks. | Carnauba | | | N-allystearamide | | |
|---|---|---|---|---|---|---|
| | Gloss | Wear | Repolish | Gloss | Wear | Repolish |
| 1 | High | Excellent | Very good | High | Excellent | Very good. |
| 2 | Slt. dull | do | do | Slt. dull | Very good | Do. |
| 3 | do | do | do | Dull | Good | Do. |
| 4 | do | Very good | Good | do | do | Do. |

We claim:
1. A process for the preparation of a composition having physical properties resembling a hard wax comprising heating an N-allylamide, having a linear carbon sidechain of a length equivalent to that of the fatty acids of a member selected from the group consisting of hydrogenated tallow and seed oils, to a temperature above its melting point thereby to liquefy it, adding to said liquid N-allylamide, in small increments, about from 0.25 to 12.0 mole percent of a free radical initiator selected from the group consisting of azobisisobutyronitrile, dichlorobenzoyl peroxide, t-butyl peroxide, lauroyl peroxide, hydroxy heptyl peroxide, succinic acid peroxide, methyl ethyl ketone peroxide, benzoyl peroxide, cumene hydroperoxide, p-methane hydroperoxide, and pinane hydroperoxide, and continuing heating the resulting liquid reaction mixture at the aforesaid temperature to maintain it in liquid form until the reaction is complete, as evidenced by the absence of the free radical initiator.

2. A process for the preparation of a composition having physical properties resembling a hard wax comprising heating an N-allylamide, having a linear carbon sidechain of a length equivalent to that of the fatty acids of a member selected from the group consisting of hydrogenated tallow and seed oils, to a temperature above its melting point thereby to liquefy it, adding to said liquid N-allylamide, in small increments, about from 0.25 to 12.0 mole percent of a free radical initiator selected from the group consisting of benzoyl peroxide and azobisisobutyronitrile, and continuing heating the resulting liquid reaction mixture at the aforesaid temperature to maintain it in liquid form until the reaction is complete, as evidenced by the absence of the free radical initiator.

3. A process for the preparation of a composition having physical properties resembling a hard wax comprising heating N-allylstearamide to a temperature of about 90° C. to liquefy it, adding to said liquid N-allylstearamide, in small increments, about from 0.25 to 12.0 mole percent of a free radical initiator selected from the group consisting of benzoyl peroxide and azobisisobutyronitrile, and continuing heating the resulting liquid reaction mixture at about 90° C. until the reaction is complete, as evidenced by the absence of the free radical initiator.

4. The process of claim 3 wherein the free radical initiator is benzoyl peroxide.

5. The process of claim 3 wherein the free radical initiator is azobisisobutyronitrile.

References Cited

Norman G. Gaylord, Allyl Polymerization IV, J. Polymer Sci. 41, 71–78 (1959).

Chiro Sakurada and Gisaku Takalashi, Allyl Polymerization XI, Chemical Abstracts 51, p. 3255g (1957); as abstracted from High Polymers (Japan) 13, 25–30 (115).

NICHOLAS S. RIZZO, Primary Examiner.

F. A. MIKA, Assistant Examiner.